No. 657,595. Patented Sept. 11, 1900.
A. J. GILLESPIE.
PENCIL POINTER.
(Application filed July 5, 1899.)
(No Model.)
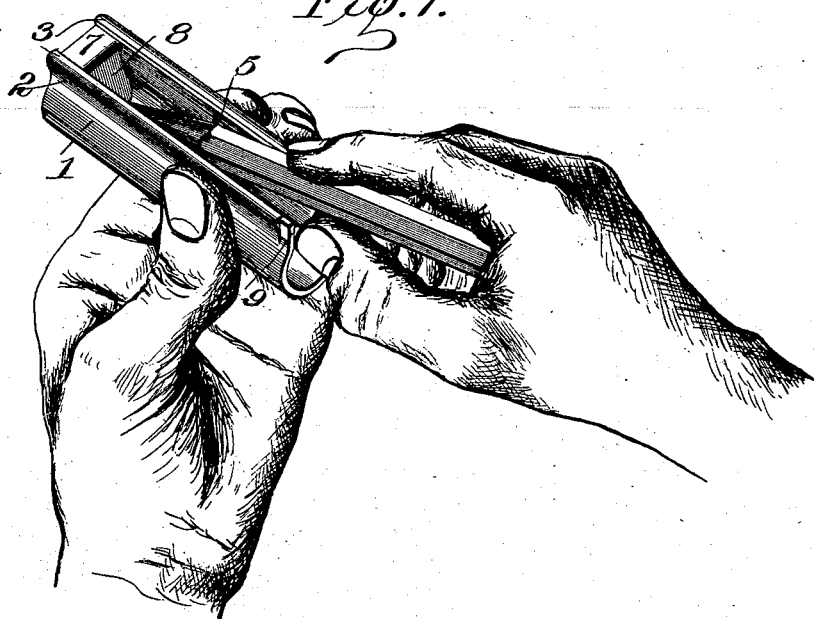
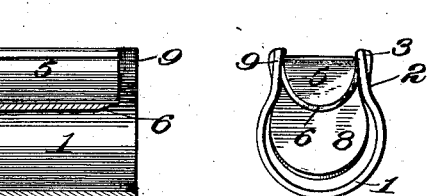
Witnesses:
Walter P. Payne
G. Willard Rich.
Inventor:
Alfred J. Gillespie
by Church & Church
his Attorneys.

UNITED STATES PATENT OFFICE.

ALFRED J. GILLESPIE, OF ROCHESTER, NEW YORK.

PENCIL-POINTER.

SPECIFICATION forming part of Letters Patent No. 657,595, dated September 11, 1900.

Application filed July 5, 1899. Serial No. 722,825. (No model.)

*To all whom it may concern:*

Be it known that I, ALFRED J. GILLESPIE, of Rochester, in the county of Monroe and State of New York, have invented certain new and useful Improvements in Pencil-Pointers; and I do hereby declare the following to be a full, clear, and exact description of the same, reference being had to the accompanying drawings, forming a part of this specification, and to the reference-numerals marked thereon.

My present invention has for its object to provide a device adapted for sharpening or pointing pencils and having a removable blade provided with multiple cutting edges and an adjustable stop for regulating the length of the point desired, said stop being secured in a suitable casing, which also acts as a receptacle to receive the shavings.

To these ends my invention consists in certain improvements in construction and combinations of parts, all as will be hereinafter described, and the novel features pointed out in the claims at the end of this specification.

In the drawings, Figure 1 is a perspective view showing the operation of a pencil-pointer constructed in accordance with my invention; Fig. 2, a longitudinal sectional view of the same; Fig. 3 an end view thereof.

Similar reference-numerals indicate similar parts.

In the present embodiment of my invention I employ a U-shaped shell or casing 1, formed of spring material, having its sides curved slightly outward, as at 2, and the edges 3 turned inward to form the grooves 4.

The cutter 5 is composed of a semicircular blade sharpened upon each end by grinding off the outer edge, as shown at 6, and is held in position by spring engagement between its edges and the grooves upon the opposite sides of the casing.

Arranged upon one end of the casing is a stop having a flat top 7, engaged by its edges in the grooves 4, and having the depending portion or ear 8 reaching into the body of the casing and adapted to act as a stop against which the pencil-point is arrested and also as a closure for one end of the casing. The stop is adjustable in the grooves 4 and may be moved in the casing relative to the cutting-blade 5 to limit the length of the pencil-point desired. The depending portion 8 is arranged at a slight angle to the top 7, as shown, and when the device is in use is adapted to extend at right angles to the pencil.

9 indicates shoulders or stops arranged at one end of the casing and located at the ends of the grooves 4, against which the cutter is engaged and prevented from withdrawal during the operation.

The cutter-blade may be easily removed when it becomes necessary to resharpen its cutting edges or when one of the edges has become dull to permit reversing the blade, which operation may be accomplished by simply forcing the blade downward, either by the fingers or with the end of the pencil, the spring in the casing allowing the sides of the latter to be separated sufficiently to permit the blade to drop into the enlarged portion at the bottom, from which it may be readily removed. When it is desired to replace the blade, it is only necessary to put the blade in the aperture between the sides of the casing and by a pressure downward springing the edges of the casing outward and allowing the blade to drop into the grooves 4.

The stop 8 may be adjusted to limit the length of the pencil-point desired by moving it along the grooves or ways 4 to the desired position, where it will be retained by spring-pressure of the casing and by the angular engagement between the ear 8 and the head 7, any pressure of the pencil against the former causing the latter to bind firmly in the ways and prevent accidental movement. The particular arrangement of the stop, however, is not essential to the practical operation of the device, as the instrument is capable of being operated successfully without the stop, or it may be held against the edge of a desk or other object.

The operation will now be readily understood. The stop being adjusted, the instrument is held conveniently in one hand and the pencil being held in the other is placed against the stop 8, resting across the blade and at an angle thereto, when as the pencil is drawn across the cutting edge the successive shavings removed will be collected in the casing.

This construction provides an instrument that is light, simple, and composed of but few parts, which are easily united, and by forming a receptacle of the casing I am enabled to provide a device that will not soil the hands of the operator and which will retain the cuttings until otherwise suitably disposed of or removed from the receptacle.

I claim as my invention—

1. In a pencil-pointer, the combination with the holder, of the cutting-blade, and a stop arranged in front of the edge of the blade with which the point of the pencil is adapted to coöperate to regulate its length as the pencil and blade are moved relatively, said blade being stationary relative to the stop during the cutting operation.

2. In a pencil-pointer, the combination with the holder, of a blade and an adjustable stop arranged in front of the cutting edge of the blade with which the point of the pencil is adapted to coöperate to regulate the length of the latter, said blade and stop being stationary relative to each other during the cutting operation.

3. In a pencil-pointer, the combination with the holder having the grooves provided with stops at the ends, of a reversible blade having opposite cutting edges and arranged in the grooves.

4. In a pencil-pointer, the combination with the holder having the grooves, and the cutting-blade therein, of the stop arranged in the grooves in front of the edge of the blade and with which the end of the pencil coöperates.

5. In a pencil-pointer, the combination with the hollow holder adapted to receive the cuttings and having the yielding sides and grooves therein, of the cutting-blade entering the grooves and held by the spring action of the sides.

6. In a pencil-pointer, the combination with the holder having the yielding sides, and the grooves therein, of the cutting-blade entering the grooves and held by the spring action of the sides.

7. In a pencil-pointer, the combination with the holder having the yielding sides and the grooves therein, of the curved cutting-blade entering the grooves and held by the sides, and an adjustable stop in front of the edge of the blade and arranged in the grooves.

8. In a pencil-pointer in which the pencil to be sharpened is adapted to be moved longitudinally relative to a cutting-blade, the combination of a holder, a cutting-blade, and a stop in front of the blade for engaging the pencil-point, said stop and blade being relatively adjustable to regulate the length of the cut but held stationary in their adjusted position during the sharpening operation.

9. In a pencil-pointer, the combination of a holder for the blade and adapted to receive the cuttings, a cutting-blade, and a stop in front of the blade for engaging the pencil-point, said stop and blade being relatively adjustable to regulate the length of the cut but held stationary in their adjusted position during the sharpening operation.

10. In a pencil-pointer, the combination with the U-shaped spring-metal holder having the grooves in the edges, the curved removable cutting-blade arranged in the grooves in the holder, and the stop held in the grooves and arranged in front of the blade to engage the pencil-point and limit the length of cut.

ALFRED J. GILLESPIE.

Witnesses:
G. WILLARD RICH,
GRACE A. RODA.